United States Patent

[11] 3,582,909

[72] Inventor Robert K. Booher
Mission Viejo, Calif.
[21] Appl. No. 805,306
[22] Filed Mar. 7, 1969
[45] Patented June 1, 1971
[73] Assignee North American Rockwell Corporation

[54] RATIOLESS MEMORY CIRCUIT USING CONDITIONALLY SWITCHED CAPACITOR
13 Claims, 6 Drawing Figs.

[52] U.S. Cl. .......... 340/173R, 307/238, 307/279, 340/173 CA
[51] Int. Cl. .......... G11c 11/40
[50] Field of Search .......... 340/173 SS, 173 FF; 307/238, 279

[56] References Cited

UNITED STATES PATENTS

| | | | |
|---|---|---|---|
| 3,286,189 | 11/1966 | Mitchell | 340/173 |
| 3,387,286 | 6/1968 | Dennard | 340/173 |
| 3,506,851 | 4/1970 | Pockinghorn | 340/173 |

*Primary Examiner*—Terrell W. Fears
*Attorneys*—William R. Lane, L. Lee Humphries and Robert G. Rogers ABSTRACT: The memory circuit includes a capacitor which has its capacitance conditionally switched between a substrate and an input electrode as a function of the potential on its fixed plate.

If a potential representing a logic one state is applied to the fixed plate during a write period of the memory cycle, the capacitance is switched to the input electrode. During a read period of the memory cycle, the potential on the fixed plate is boosted by an amount proportional to the potential applied to the input electrode of the capacitor. The potential on the fixed plate is used on the gate electrode of a field effect device to drive the output electrode to the potential appearing on the input electrode, assuming that the boosted potential of the fixed plate is at least one threshold greater than the potential applied to the input electrode. The output voltage represents the logic state of the stored information.

If a logic zero state had been stored, the capacitance would have remained connected to the substrate so that the voltage on the input electrode of the capacitance would have had no effect on the circuit.

The circuit uses a second capacitor, regenerated during each read cycle, to regenerate the charge on the conditionally switched capacitor as well as the charge on the inherent capacitance connected to the conditionally switched capacitor. As a result, a nonvolatile memory is provided.

INVENTOR.
ROBERT K. BOOHER

BY Robert G. Rogers

ATTORNEY

INVENTOR.
ROBERT K. BOOHER
BY Robert G. Rogers
ATTORNEY

RATIOLESS MEMORY CIRCUIT USING CONDITIONALLY SWITCHED CAPACITOR

BACKGROUND OF THE INVENTION

1. Field of the Invention

The invention relates to a nondestructive ratioless memory circuit using field effect devices and more particularly to such a circuit which uses a conditionally switched capacitor as a storage device.

2. Description of the Prior Art

The patent application entitled "Field Effect Conditionally Switched Capacitor," filed Mar. 4, 1969, Ser. No. 804,171, by Robert K Booher and Robert W. Polkinghorn, describes a conditionally switched capacitor in which its capacitance is switched between a substrate and an input electrode as a function of a voltage on its fixed plate. One plate, comprising the substrate underlying the fixed plate, is switched to the input electrode when the applied voltage exceeds the threshold voltage of the device. When the applied voltage is less than the threshold voltage, the plate is switched to the substrate.

That device can be used in a ratioless memory circuit embodiment as a storage capacitor having the added advantage of being able to boost the voltage applied to a control electrode of a field effect device used to provide an output signal which indicates the logic state of the stored information. As a result of being able to boost the control voltage, the output electrode of the field effect device can be driven to a higher voltage value than would normally be expected.

Other ratioless memory circuits, shown in patent applications entitled "Memory Circuit Using Storage Capacitance and Field Effect Devices" filed Jan. 7, 1969, Ser. No. 789,442, By Robert K. Booher, and "Read-Write Memory Circuit" filed Jan. 7, 1969, Ser. No. 789,455, by Robert W. Polkinghorn, use capacitors for storing potentials representing the logic states.

The storage capacitor in the Booher circuit is required to be charged to a minimum potential of at least three times the threshold potential of the field effect devices in order to permit the circuit to be regenerative. By means of a slight variation, it is possible to reduce the requirement to only two times the threshold potential of the field effect devices.

The Polkinghorn invention reduced the minimum potential of the storage capacitor to only one times the threshold potential of the field effect devices.

The present invention uses the condition of the switched capacitor, described above, to implement a circuit having the same advantages as the a Polkinghorn circuit but which can be implemented with fewer components. In addition, the invention can use sine wave signals as the read and write clock signals. It is less difficult to generate and maintain sine wave clock signals than signals which have a relatively fast rise and fall time, especially since the conductors for the clock signals typically will have high inherent capacitances. The preferred embodiment of the circuit avoids the problems associated with "trapped" charge in FIG. 1 of the referenced Polkinghorn circuit in which it was possible to generate a voltage representing a logic one state when in fact a logic zero state had been stored.

SUMMARY OF THE INVENTION

Briefly, the invention comprises a ratioless memory circuit using as a storage device a capacitor which has its capacitance switched between an input electrode and a substrate as a function of the voltage representing the logic state being stored. A ratioless circuit is one in which an output voltage level does not depend on the resistance ratio between field effect transistors connected for example in a series circuit. If a logic one is stored by applying a voltage to the fixed plate of the capacitor which exceeds the inversion threshold of the substrate, the second capacitor plate becomes isolated from the substrate by surface inversion and is connected to the input electrode. In effect, its capacitance is switched to the input electrode. If a logic zero is stored, as when the voltage applied to the fixed plate is less than the inversion threshold voltage of the substrate, surface inversion does not occur and the capacitance remains connected to the substrate, normally at electrical ground.

During a read period, a read clock signal is applied to the input electrode of the capacitor. If a logic one was previously stored during a writer period, the voltage on the fixed plate is increased by the read signal and used a control voltage for a field effect transistor. The read signal is also applied to one electrode of the field effect transistor. The voltage on the fixed plate is at least one threshold greater (absolute value) than the read signal voltage so that the other electrode of the transistor is driven to the value of the read signal which represents the state of the stored information.

If a logic zero has been stored, the second capacitor plate would not be connected to the input electrode of the capacitor so that a read signal applied to the input electrode would be isolated from the fixed plate of the capacitor and the field effect device would not turn on.

A second capacitor is provide at the common input/output terminal to the memory circuit to store a charge as a function of the charge stored by the conditionally switched capacitor. The charge on the capacitor is regenerated during each read period of the memory cycle so that each write period, when the circuit is not being addressed, the regenerated charge is used to regenerate the charge on the conditionally switched capacitor, as well as the charge on the inherent capacitance connected to the conditionally switched capacitor. As a result, the memory circuit is regenerative.

Sine wave clock signals may be used to drive the circuits comprising the memory since the problem of trapped charge as described in the Description of Prior Art section herein, is overcome by the interconnections of the devices comprising the memory circuit.

The information in the form of a voltage potential is written into, read from, and regenerated within the memory circuit without the requirement for resistive divider action.

Therefore, it is an object of this invention to provide a ratioless memory circuit using a conditionally switched capacitor for storing potentials representing logic states and for conditionally boosting the control voltage of a field effect transistor as a function of the stored logic state.

It is another object of this invention to provide a ratioless memory circuit using a capacitor having a plate which is conditionally switched between a substrate and an input electrode as a function of a voltage applied to the other capacitor plate.

It is still another object of this invention to provide a ratioless memory circuit using a capacitor having its capacitance conditionally switched between an input electrode and a substrate for storing potentials representing logic stages and for conditionally boosting the control voltage of a field effect transistor which is responsive to the boosted voltage.

It is still another object to provide an improved memory circuit including means for regenerating the stored logic information during each memory cycle in which the circuit is not addressed.

A still further object of the invention is to provide an improved memory circuit using field effect devices in which logic information can be written into, read from, and regenerated within the circuit without the necessity for resistive divider action.

It is still a further object of this invention to provide a memory circuit using a capacitor having one plate switched as a function of voltage applied to its other plate for storing the applied voltage representing a logic state and for boosting the drive voltage on the field effect transistor for providing a readout of the stored logic state.

A still further object of this invention is to provide a memory circuit using a field effect storage capacitor which has its capacitance conditionally switched between an input electrode and a substrate.

Still, a further object of this invention is to provide a ratioless memory circuit using a conditionally switched storage capacitor and sine wave clock signals for controlling the memory cycle of the circuit.

These and other objects of the invention will become more apparent in connection with the description of the drawings, a brief description of which follows;

DESCRIPTION OF THE PREFERRED EMBODIMENTS

Figures 1, 3:
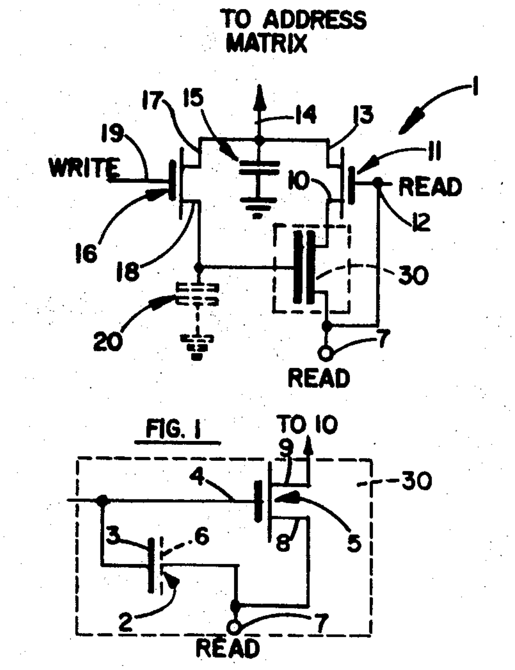
FIG. 1 illustrates a schematic drawing of one embodiment of a ratioless nondestructive memory circuit using a conditionally switched capacitor as a storage and voltage boosting device.
FIG. 3 is a detail representation of the combination switchable capacitor and standard field effect transistor shown generally in FIGS. 1 and 2.
Figure 2:
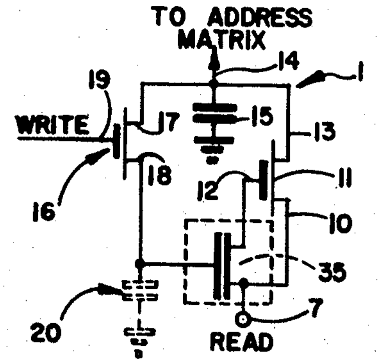
FIG. 2 illustrates a schematic of a different embodiment of a ratioless nondestructive memory circuit using a conditionally switched capacitor as a storage and voltage boosting device.

FIG. 1 is a schematic illustration of one embodiment of ratioless circuit 1. FIG. 3 shows the equivalent circuit of the portion of FIG. 1 identified by the numeral 30 as comprising conditionally switched capacitor 2 having its fixed plate 3 connected to control electrode 4 of MOS device 5. In FIG. 2, the capacitor 2 and MOS device 5 are identified by the numeral 35. The symbol, in the form of two parallel lines, is used to represent the combination.

Before continuing the description of FIG. 1, FIG. 3 is described. Capacitor 2 includes plate 6 which is conditionally connected to input electrode 7 as a function of the voltage potential on fixed plate 3. The manner in which the capacitance of capacitor 2 is switched between reference potential such as the potential of a substrate (not shown) and an input electrode was described previously. Stated alternatively, the plate 6 of capacitor 2 is an inversion layer (not diffused) in the substrate region subjacent the fixed plate 3. The inversion layer is formed when a certain voltage level is applied to the fixed plate 3. When the voltage level is applied, the inversion layer is formed and is electrically connected to input terminal 7. Before the certain voltage level is applied, the inversion layer does not exist and the relatively negligible capacitance between plate 3 and the substrate region is connected in the usual case to electrical ground. It could be stated that the plate 6 is formed as an inversion layer which is connected to terminal 7 or that the capacitance of capacitor 2 is increased and switched between terminals 7 and electrical ground.

Electrode 9 of device 5 are shown in FIG. 3 is connected to electrode 10 of field effect device 11 as shown in FIG. 1.

Figure 6:
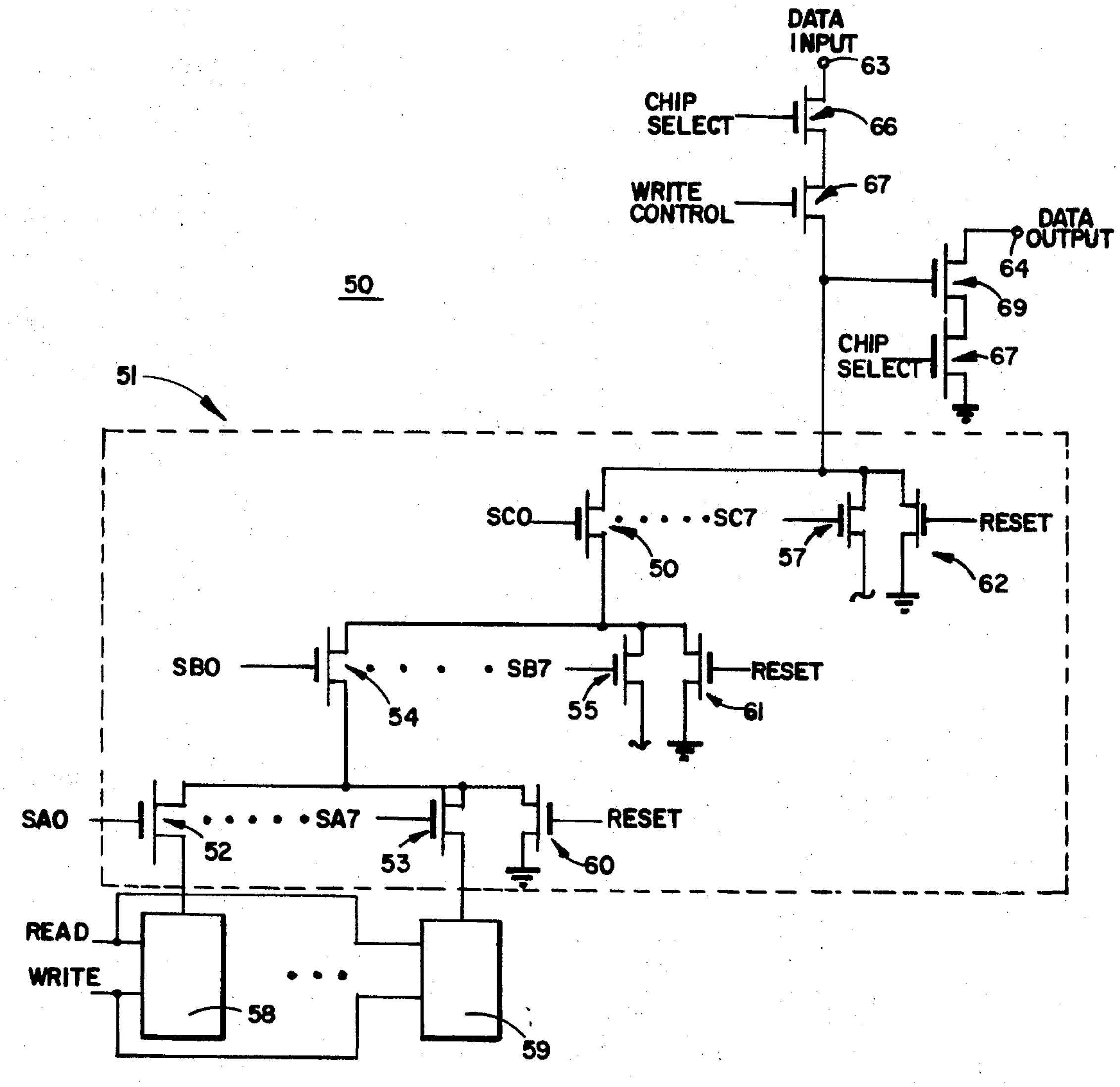
FIG. 6 illustrates a portion of an address matrix for a memory system comprising a plurality of ratioless memory circuits each using a conditionally switched capacitor.

FIG. 1 further shows MOS device 11 as having electrode 13 connected to common input/output line 14 which passes through an address matrix partially shown in FIG. 6 to an output terminal of a memory system. Control electrode 12 of MOS device 11 receives a read clock signal for driving electrode 13 of the device.

Capacitor 15 is connected between the common input/output line 14 and the substrate of the chip in which the memory device is formed for regenerating the voltage on conditionally switched capacitor 2. The substrate is illustrated as a ground connection although in other embodiment, the substrate could be biased as a reference potential other than electrical ground.

The FIG. 1 circuit also includes MOS device 16 having one electrode 17 connected to the common input/output line 14 and another electrode 18 connected to fixed plate 3 of capacitor 2 and control electrode 4 of MOS device 5 (see FIG. 3). The inherent electrode capacitance associated with electrodes 4 and 18 and the conductors between the two electrodes is represented by the dotted capacitor 20 connected between electrodes 4, 18, and ground. The inherent capacitance is charged simultaneously with capacitor 2. The ground connection is used, as indicated above, to indicate the potential of the substrate. MOS device 16 also includes control electrode 19 which receives a write clock signal for driving electrodes 18 to the potential appearing on electrode 17.

Figure 4:
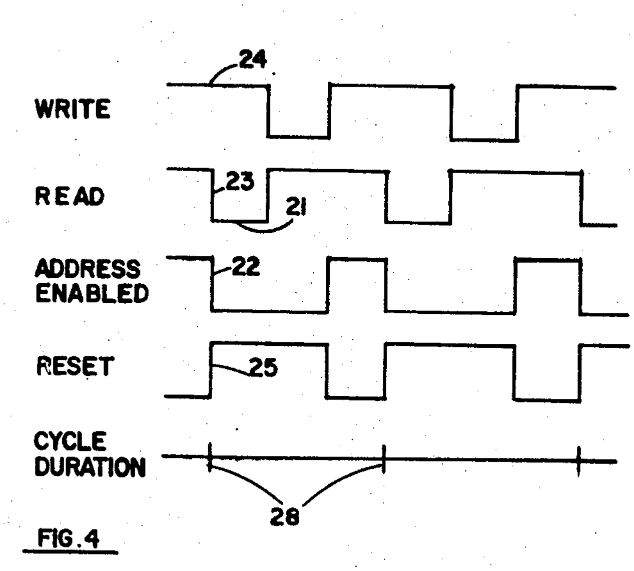
FIG. 4 is a diagram of the clock signal and other signals used by the memory circuits of the various figures during a memory cycle.
Figure 5:
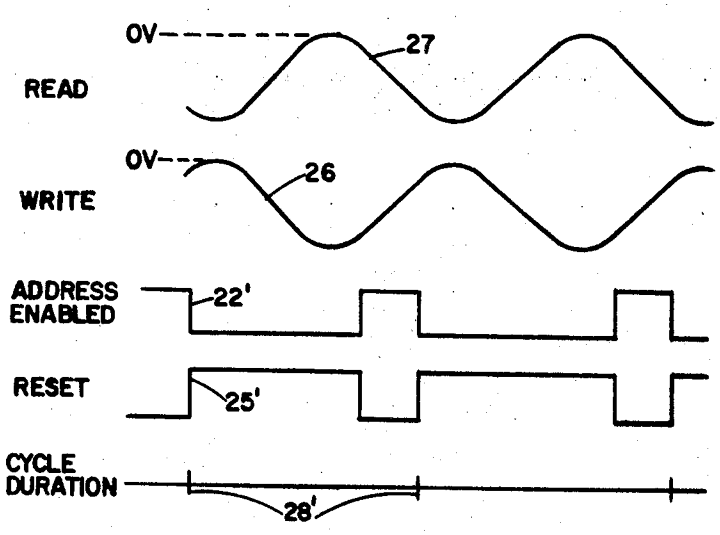
FIG. 5 is a diagram of sine wave clock signals and other signals which can be used by the memory circuits of the various figures.

The operation of the circuit can best be understood by referring to the signals shown in FIGS. 4 and 5. Both sets of signals may be used to control the operation of the circuit although the sinusoidal clock signals shown in FIG. 5 are preferred since such signals are relatively easier to generate than the FIG. 4 signals having a fast rise and fall time.

Circuit 1 is addressed when the address signal 22 becomes true. During the time that the circuit is addressed, information can be written into the circuit or read out from the circuit. A memory cycle consists of a read period, a write period and a reset period. The reset period of the memory cycle is described in connection with FIG. 6.

During the write period of the memory cycle, write clock signal 24 becomes true so that the potential appearing on common input/output line 14 is applied to plate 3 of capacitor 2. If the potential exceeds the inversion threshold voltage, surface inversion occurs in the substrate area underneath plate 3 for forming plate 6 connected to input terminal 7. For purposes of this description, a voltage in excess of the inversion threshold is assumed to be a logic one state. Voltage less than a threshold usually ground, is assumed to be a logic zero state. Therefore, when a logic one state is stored, the capacitance of capacitor 2 is switched to the input electrode 7 whereas when a logic zero state is being stored, the capacitance remains connected to the substrate which is electrically isolated from the input electrode. Capacitor 15 is also charged during the write period as a function of the information being stored.

During the read interval of the memory cycle, the read clock signal 23 becomes true for applying a negative voltage to input electrode 7 which is also connected to electrode 8 of MOS device 5 and to control electrode 12 of MOS device 11. Assuming that a voltage representing a logic state one was previously stored in the circuit by capacitor 2, when the read clock signal becomes true the voltage on the control electrode 4 is increased by approximately the amount of the read signal. Since electrode 8 is connected to the read clock signal, and since the control voltage is in excess of the read clock signal by the amount of the voltage initially applied to plate 3 during the write period, electrode 9 of MOS device 5 is driven to the negative level 21 of the read signal 23. Simultaneously, MOS device 11 is turned on by the read signal for driving output electrode 13 to the read signal voltage minus a threshold. That voltage appears on the common input/output line 14 to represent the logic one state of the information stored. If that voltage is in excess of the voltage stored by capacitor 15 during the write, the voltage will be increased.

When a logic zero is being stored, the common input/output line 14 is connected to a ground potential and the capacitance of capacitor 15 is charged accordingly. If a logic one had been previously stored, the capacitor would be discharged to ground as would have capacitors 2 and 20 whereas if a logic zero had been stored previously, the charge on the capacitor would have remained the same. When the write signal 24 becomes true, the ground potential one line 14 is applied to plate 3 and to control electrode 4. Since the potential is less than a threshold, the capacitance of capacitor 2 remains or becomes connected to the substrate so that input electrode 7 is isolated from control electrode 4. During the read period, MOS device 5 remains off so that the common input/output line remains at ground and indicates that a logic zero has been stored by the memory circuit.

During every memory cycle in which the circuit is not addressed, MOS device 16 is turned on by the write clock signal 24 to permit capacitor 15 to supply charge to capacitors 2 and 20 to replace the charged which may have leaked from the capacitors. Capacitor 15 is regenerated during each read period, as indicated above, by the read clock signal device since devices 5 and 11 are turned on.

When a logic zero is stored following a logic one, capacitors 2, 15, and 20 are discharged during the write period. Thereafter, during each memory cycle in which the circuit is not addressed, capacitor 15 remains discharged and device 5 remains off. Therefore, capacitors 2 and 20 also remain discharged even though device 16 is periodically turned on by write clock signal 24.

Although the description of the circuit operation remains the same, whenever a sinusoidal write clock signal 26 and a sinusoidal read clock signal 27 are used, the overall system using the circuit is improved. The sinusoidal signals are shown in FIG. 5. In circuits which will not function properly when the read clock and write clock signals overlap, the rise and fall time of the clock signals becomes a significant factor relative to the overall speed of the memory circuit. The FIG. 1 circuit will function properly with the sinusoidal signals shown in FIG. 5. The FIG. 2 circuit will function properly if care is taken with the timing of the signal which is applied to device 67 of FIG. 6. The main attribute of the FIG. 2 circuit is that there is only one device (11) in the current path between the read clock 7 and the common input/output line 14. As a result, there is less impedance between terminal 7 and the common input/output line 14. Therefore, the FIG. 2 circuit is potentially faster than the FIG. 1 circuit.

The reset signals 25 and 25' shown in FIGS. 4 and 5 are described in connection with FIG. 6. The markers 28 and 28' showing cycle duration, are included for convenience.

The FIG. 2 embodiment is similar to the FIG. 1 embodiment except that electrode 9 of MOS device 5 is connected to control electrode 12 of MOS device 11 and electrode 10 of MOS device 11 is connected to input electrode 7 instead of being connected to electrode 9 of MOS device 5. The other circuit components and connections are the same as shown in FIG. 1.

The operation of the FIG. 2 circuit is best understood by referring to the clock signals appearing in FIGS. 4 and 5. For purposes of this description, the clock signals in FIG. 5 are used although as indicated above either set of signals may be used. The FIG. 5 set of signals is actually preferred for the FIG. 1 circuit although they can be used for both circuits if the write interval is properly timed. The sinusoidal signals overcome the problems often associated with signals having fast rise and fall times as shown in FIG. 4. If the signals could be switched from one level to the next, i.e. from ground to a negative level without delay, the problem would not exist. However, as a practical matter, the switch from one level to the next requires a certain interval of time depending upon the driver capability and the amount of capacitance on the line. In circuits which will not function properly if the read and write clocks overlap, the timing of these signals must be stretched out to allow time for the transition.

Logic one information is written into the circuit 1 by applying a negative voltage on plate 3 of the capacitor 2 so that electrode 9 of MOS device 5 is driven to the negative level of read clock signal 27 during the read interval of the memory cycle. Simultaneously, control electrode 12 receives the read clock signal 27 from electrode 9. Electrode 13 of MOS device 11 is driven to the value of the read clock signal 27 appearing on its electrode 10 minus the threshold voltage of device 11. The voltage appearing on electrode 13 represents the logic one information stored in the circuit.

Capacitor 15 regenerates during every read cycle, shares its charge with capacitors 20 and 2 during write intervals in which the circuit 1 is not addressed, as previously described in connection with FIG. 1.

If a logic zero had been stored, MOS device 5 and MOS device 11 would have remained off so that the input/output line 14 would be at ground during the write period.

If a logic zero is stored following a logic one, capacitor 2 is discharged to the ground potential applied to plate 3 through common input/output line 14. When the voltage on the plate 3 becomes less than a threshold voltage, the capacitance switches back to the substrate for isolating control electrode 4 from the input terminal 7. At the same time, MOS device 5 turns off so that MOS device 11 is also turned off.

Since electrode 9 is connected to control electrode 12 of MOS device 11, it is important that the inherent capacitance associated with electrode 12 be discharged to ground during the period in which the logic zero information replaces the logic one information. Otherwise, after MOS device 5 is turned off, a charge may remain on electrode 12 so that MOS device 11 could remain slightly on for driving electrode 13 to a potential other than ground during the read interval. In order to avoid "trapping" the charge, care must be taken to write information into the circuit through line 14 during the period the read signal has a value between the threshold voltages of the MOS devices. In other words, the logic zero (ground) information should not appear on line 14 until after the read clock signal has caused the inherent capacitance (not shown) associated with control electrode 12 of MOS device 11 to be discharged to less than a threshold voltage. For example, if points A and B are used to represent the threshold voltages of the devices, the write information should not appear on line 14 until the read signal is between points C and D.

It is also pointed out that the information appearing on line 14, in the form of a voltage potential, is written into the circuit directly through MOS device 16. Similarly, the information read from the circuit is read directly through MOS device 11. In neither case is there necessity for voltage divider action between two or more MOS devices in order to obtain the desired output voltage. As a result, the memory circuit is a ratioless memory circuit.

As shown in FIG. 5, however, by the time the write signal 26 is at its maximum negative value, the read signal is at its minimum value of ground so that by the time capacitor 2 discharges from its negative voltage to a voltage less than a threshold of the substrate (not shown) the capacitance associated with electrodes 9 and 12 will have been discharged to less than a threshold.

FIG. 5 is a schematic illustration of memory system 50 including an illustration of a portion of address matrix 51. The address matrix comprises a plurality of MOS devices 52...53 at the A level of the matrix, MOS devices 54...55 at the B level, and MOS devices 56...57 at the C level. The omitted devices are represented by dots for convenience. The MOS devices at each level are addressed by signals SA0...SA7...SB0...SB7, and SC0...SC7 applied to control electrodes as the devices depending on which of the memory circuits 58...59 are being addressed.

The memory circuits, shown in block form, are identical to the circuits shown in FIGS. 1, 2, and 3 of the drawings. Read and write clock signals provide inputs to each circuit and are previously described.

In addition, the levels of the address matrix include reset devices 60, 61 and 62 for the A, B, and C levels respectively. The reset devices are turned on after each write period of the memory cycle by the reset signals 25 and 25', shown in FIGS. 4 and 5, to reset the inherent capacitance of the electrodes and conductors of the system to ground prior to a read period.

The address matrix 51 is connected to the data input terminal 63 when information is being written into an addressed memory circuit. The address matrix 51 is connected to device 69 which drives data output terminal 64 when information is being read from an addressed memory circuit. MOS devices 66 and 67 control the writing of information into a memory circuit of a selected chip. For example, a particular chip may be comprised of 512 memory circuits and a particular computer system may be comprised of several chips. Both the chip and the memory circuit must be addressed during a reading or writing operation. Signals on the control electrodes of the MOS devices 66 and 67 become true for connecting the voltage potential on the input terminal 63, ground for the logic zero state or a negative potential for a logic one state to the memory circuit being addressed.

During a reading operation, MOS device 67 is turned off and MOS device 68 is turned on for applying a ground potential to the output terminal 64 through MOS device 69 if the addressed memory circuit contains a logic one and for leaving the output terminal at a precharged voltage level if a logic zero is stored in the addressed circuit. MOS device 68 selects the particular chip which is being addressed during the read period.

By way of further illustration, assume that a logic one is stored in memory circuit 58. During a reading operation, the negative voltage, approximately the potential of the read clock signal, appears on the control electrode of MOS device 69 for turning the device on. When the device is turned on, the output terminal 64 is connected to ground through MOS device 68. If a logic zero had been stored, the device 69 would have remained off.

The mechanization of the output as shown permits a high speed bipolar current detector to be employed to enhance the overall speed of the memory system.

It should be understood that although P channel devices are described herein, N channel devices could also be used. In that case, the voltage polarities would be changed. In addition, although MOS transistors are described, MNOS, MNS or other enhancement mode field effect devices could also be used.

I claim:

1. A memory circuit having an output voltage level relatively independent of the resistance ratio between circuit elements and having a memory cycle, said circuit comprising,
- means for applying a potential to said circuit representing the logic state of information being stored,
- an input electrode,
- capacitor means including a fixed plate connected to said means for applying, said capacitor means including a second plate comprising an inversion layer formed in the substrate region subjacent said fixed plate, said inversion layer being formed as a function of the logic state of the information being stored for electrically connecting said second plate to the input electrode.

2. The combination recited in claim 1 wherein said capacitance is switched to said input electrode when the information being stored has a logic one state and wherein said capacitance is connected to a reference potential when the state of the information being stored is a logic zero.

3. The combination recited in claim 1 including read clock signal means connected to said input electrode for increasing the potential on said fixed plate when information having a logic one state is being stored by said capacitor means,
- means including an output electrode for responding to the potential on said capacitor plate after the increase for driving the output electrode to a potential representing said logic one state.

4. The combination recited in claim 3 wherein said capacitor means includes means for isolating from said means responsive when a logic zero state is stored by said capacitor means and said means responsive is prevented from responding to said read clock signal means.

5. The combination recited in claim 4 wherein said means for applying a potential to said memory circuit includes a first field effect transistor having a control electrode responsive to a write clock signal means for connecting said fixed plate to said potential during a write interval of said memory cycle during which interval logic information is stored in said memory circuit whereby resistive divider action is not required when storing the information in said circuit.

6. The combination recited in claim 5 wherein said means responsive to the potential on said fixed plate after the increase, includes a second field effect transistor having its control electrode connected to said fixed plate, a first electrode connected to said read clock signal means, and a second electrode driven to the voltage level of said read clock signal by the potential on said fixed plate after the increase.

7. The combination recited in claim 6 including a third field effect transistor having a first electrode connected to said second electrode of said second field effect transistor and having a control electrode connected to said read clock signal means for driving its second electrode to an output voltage representing a stored logic one state during a read interval of said memory cycle whereby resistive divider action is not required when reading out information from said circuit.

8. The combination recited in claim 6 including a third field effect transistor having a first electrode connected to said read clock signal means and having its control electrode connected to said second electrode of the second field effect transistor for driving its other electrode to a potential representing a stored logic one state during a read interval of said memory cycle whereby resistive divider action is not required when reading out information from said circuit.

9. The combination recited in claim 5 including means for providing sinusoidal read and write clock signals for avoiding the requirement of clock signals having relatively fast rise and fall times.

10. The combination recited in claim 7 including means for addressing said circuit and a capacitor means connected between said other electrode of the third field effect transistor and a reference potential for being charged to a potential representing the state of the stored logic information during said write interval of the memory cycle when said circuit is being addressed and for being regenerated by the potential of the voltage appearing on said second electrode of the third field effect transistor during the read interval of said memory cycle when the circuit is not being addressed, said capacitor being connected to said fixed plate during said write interval when the circuit is not being addressed for regenerating the charge of said capacitor means.

11. The combination recited in claim 10 including means for resetting the inherent capacitance of said means for addressing to a reference potential after every write interval.

12. The combination recited in claim 8 including means addressing said circuit and a capacitor means connected between said second electrode of the third field effect transistor and a reference potential for being charged to a potential representing the state of the stored logic information during said write interval of the memory cycle when said circuit is being addressed and for being regenerated by the potential of the voltage appearing on said second electrode of the third field effect transistor during the read interval of said memory cycle when the circuit is not being addressed, said capacitor being connected to said fixed plate during said write interval when the circuit is not being addressed for regenerating the charge of said capacitor means.

13. A field effect transistor ratioless memory circuit having a memory cycle, said circuit comprising,
- means including field effect transistor means for applying a potential to said circuit representing the logic state of information being stored,
- an input electrode,
- capacitor means including a field effect transistor and having a fixed plate connected to said means for applying and an inversion layer in a substrate region subjacent said fixed plate forming the second plate of said capacitor means, said inversion layer being formed by a voltage level on said fixed plate representing a certain logic state for switching the capacitance of said capacitor means conditionally to said input electrode as a function of the logic state of the information being stored.